United States Patent
Kiesel et al.

(10) Patent No.: US 9,933,056 B2
(45) Date of Patent: Apr. 3, 2018

(54) DEFLECTION MEANS FOR INSPECTION SYSTEMS

(71) Applicant: iPEK International GmbH, Sulzberg (DE)

(72) Inventors: Marvin Kiesel, Oberstdorf (DE); Dominik Pomp, Waltenhofen (DE)

(73) Assignee: IPEK INTERNATIONAL GMBH, Sulzberg (DE)

( * ) Notice: Subject to any disclaimer, the term of this patent is extended or adjusted under 35 U.S.C. 154(b) by 118 days.

(21) Appl. No.: 15/042,600

(22) Filed: Feb. 12, 2016

(65) Prior Publication Data
US 2016/0238113 A1 Aug. 18, 2016

(30) Foreign Application Priority Data
Feb. 13, 2015 (DE) .................... 20 2015 100 712 U

(51) Int. Cl.
| | |
|---|---|
| *F16L 55/28* | (2006.01) |
| *F16H 19/08* | (2006.01) |
| *F16L 55/26* | (2006.01) |
| *G03B 37/00* | (2006.01) |

(52) U.S. Cl.
CPC .............. *F16H 19/08* (2013.01); *F16L 55/26* (2013.01); *F16L 55/265* (2013.01); *F16H 2019/085* (2013.01); *F16L 2201/30* (2013.01); *G03B 37/005* (2013.01)

(58) Field of Classification Search
CPC ... F16L 2101/30; F16L 55/28; F16L 2101/50; G01M 3/005; G01M 3/18
See application file for complete search history.

(56) References Cited

U.S. PATENT DOCUMENTS

| | | | | |
|---|---|---|---|---|
| 2,940,302 A | * | 6/1960 | Scherbatskoy | G01M 3/005 250/303 |
| 3,764,736 A | * | 10/1973 | Kosky | G21C 19/00 348/373 |
| 4,532,545 A | * | 7/1985 | Hanson | E21B 47/0002 175/40 |
| 4,677,472 A | * | 6/1987 | Wood | F17D 5/00 348/84 |
| 5,018,545 A | * | 5/1991 | Wells | B08B 9/0495 134/113 |
| 5,084,764 A | * | 1/1992 | Day | G01M 3/005 348/84 |
| 5,164,826 A | * | 11/1992 | Dailey | B25J 5/005 348/83 |

(Continued)

FOREIGN PATENT DOCUMENTS

| | | |
|---|---|---|
| DE | 101 02 056 A1 | 7/2002 |
| DE | 203 17 314 U1 | 8/2004 |

*Primary Examiner* — David A Rogers
(74) *Attorney, Agent, or Firm* — Myers Wolin, LLC

(57) ABSTRACT

A deflection device for an inspection device is provided, wherein the deflection device has a working appliance having a main body and a pivoting element. The pivoting element is arranged pivotably about a pivot axis relative to the main body, a flexible fixation element, having a first end and a second end, wherein the main body is arranged at the first end, and a pulling element having a first end and a second end, wherein the first end of the pulling element is fixed at the pivoting element, and wherein the second end of the pulling element is fixed in the region of the second end of the fixation element.

22 Claims, 2 Drawing Sheets

(56) References Cited

U.S. PATENT DOCUMENTS

| | | | | | |
|---|---|---|---|---|---|
| 5,364,473 | A | * | 11/1994 | Van Der Does | B08B 9/055 |
| | | | | | 134/22.11 |
| 5,501,115 | A | * | 3/1996 | Kamiyama | B29C 63/0052 |
| | | | | | 73/40.5 R |
| 5,571,977 | A | * | 11/1996 | Kipp | E03F 7/12 |
| | | | | | 73/865.8 |
| 5,956,135 | A | * | 9/1999 | Quesnel | G01M 3/005 |
| | | | | | 138/97 |
| 6,179,058 | B1 | * | 1/2001 | Wittrisch | E21B 23/14 |
| | | | | | 166/384 |
| 6,313,869 | B1 | * | 11/2001 | Hyp | G21C 17/017 |
| | | | | | 348/82 |
| 6,715,370 | B2 | * | 4/2004 | Tasca | F16L 55/38 |
| | | | | | 15/104.03 |
| 9,599,571 | B2 | * | 3/2017 | Penza | F16K 7/10 |
| 2009/0177202 | A1 | * | 7/2009 | May | A61B 17/32002 |
| | | | | | 606/79 |
| 2012/0265176 | A1 | * | 10/2012 | Braun | A61B 17/29 |
| | | | | | 606/1 |
| 2015/0346012 | A1 | * | 12/2015 | Zimmerman | G01F 23/296 |
| | | | | | 73/290 V |
| 2016/0316997 | A1 | * | 11/2016 | Viebach | A61B 1/00071 |

* cited by examiner

DEFLECTION MEANS FOR INSPECTION SYSTEMS

CROSS REFERENCE TO RELATED APPLICATIONS

This application claims priority to German Application No. 20 2015 100 712.4, filed Feb. 13, 2015, the contents of which are incorporated by reference herein.

TECHNICAL FIELD

The invention relates to a deflection means for deflecting a working appliance of an inspection and/or maintenance system, as well as an inspection and/or maintenance system with a deflection means according to the invention.

BACKGROUND

For performing pipe or sewer inspections or sewer cleaning or maintenance works, it is known to use so-called sewer or pipe inspection and/or maintenance systems, which may be introduced into the sewage pipe or duct, and may be moved within the sewage pipe, for example, advanced. A main connection pipe usually is a highly branched piping system, which leads to a main pipe, into which the sewer inspection and/or maintenance systems are introduced.

The inspection or maintenance systems, hereby, have to be configured such that they are able to branch off from the main pipe into a subsidiary pipe in order to also inspect or service the subsidiary pipe.

For this, known inspection or cleaning systems use guide and/or deflecting devices projecting beyond the contour of the front end of the inspection or maintenance system, and which may be pivoted relative to the inspection or maintenance system.

Such a system is known, for example, from DE 203 17 314 U1. Here, a camera unit is arranged at the front end of the inspection system which is rotatable about an axis running in advancing direction, wherein a steering rod is fixed to a rotation mechanism. During advancing towards a subsidiary pipe, the rotation mechanism is rotated such that the steering rod at least partially projects into the subsidiary pipe such that the steering rod, upon further advancing of the inspection system, rests on the side wall of the subsidiary pipe, and thus effects a turning off of the inspection system into the subsidiary pipe.

From DE 101 02 056 A1, a satellite camera of a pipe inspection system is known, at which a guiding device is arranged being provided for deflection of the satellite camera. The guiding device is configured as a deflection device which may be advanced beyond the periphery of the satellite camera.

Such systems, however, are disadvantageous in that the guiding or steering device projecting beyond the camera contour may lie in the viewing angle of the camera image, and thereby may affect the inspection negatively. Moreover, these guiding and steering devices may affect the mobility, for example, of the camera head, negatively.

If a tool, for example, a gripping device or a milling tool is provided instead of a camera head, the guiding device may even prevent the tool from being able to reach the location to be processed, if no corresponding means are provided by means of which the steering rod can be retracted or folded away.

Therefore, it is an object of the present invention, to at least partially avoid the disadvantages known from prior art and to provide solutions which allow for better and simpler turning off from a main pipe into a subsidiary pipe without negatively affecting the function of the inspection and/or maintenance units by this. Further, the solution should be of simple design.

SUMMARY

According to the invention, this object is solved by a deflection device of an inspection means as well as an inspection and/or maintenance system according to the independent claims. Preferred further developments and embodiments of the invention are defined in the respective dependent claims.

Accordingly, a deflection means of an inspection means is provided, wherein the deflection means comprises:
 a. a working appliance having a main body and a pivoting means, wherein the pivoting means is arranged at the main body pivotably about a pivot axis relative to the main body,
 b. a flexible fixation means with a first end and a second end, wherein the main body is arranged at the first end, and
 c. a pulling means with a first end and a second end, wherein the first end of the pulling means is fixed at the pivoting means, and wherein the second end of the pulling means is fixed in the area of the second end of the fixation means.

Thereby, the pulling means may be operated by a pivoting movement of the pivoting means in order to deflect the inspection means or the working appliance by a deflection force effected thereby in order to allow for a turning off of the inspection means into a subsidiary pipe of a main pipe. Thereby, drive means already provided at the inspection means are used in an advantageous manner in order to effect the deflection of the inspection means. Thus, additional drive means, which are exclusively provided for the deflection of the inspection means can be omitted such that the design effort for the realization of the deflection of the inspection means can be kept low.

The main body may comprise a housing, wherein the pivoting means is arranged at or in the housing pivotably about the pivot axis relative to the housing.

The drive means may comprise a camera head and the housing a camera housing, wherein the pivoting means is pivotable relative to the camera housing.

A rotation means may be provided at the second end of the fixation means, wherein the second end of the pulling means is fixed to the rotation means.

According to an embodiment of the invention, the working appliance or the housing may be arranged rotatably about the longitudinal axis of the fixation means at the fixation means. Thereby, the inspection means may be deflected or turned away into various directions. The working appliance or the housing only has to be rotated such that the region, in which the pulling means is fixed to the pivoting means is directed into the desired deflection direction.

According to an embodiment of the invention, moreover, the rotation means may be arranged rotatably about the longitudinal axis of the fixation means at the fixation means.

Hereby, it is preferable, if the rotation means and the working appliance or the housing is rotatable synchronously about the longitudinal axis of the fixation means. Thereby, it is avoided in an advantageous manner that the pulling means, upon multiple rotation of the camera head, is wound up around the fixation means.

According to a preferred embodiment of the invention, the pulling means may comprise a pulling rope. The pulling rope may consist of different materials. However, it is preferable, if the pulling means is made of a stable abrasion resistant material.

According to an embodiment of the invention, the rotation means may be arranged movably in axial direction at the second end of the fixation means. Thereby, for example, it may be ensured that the pulling means or the pulling rope always is slightly biased in a non-deflected state of the inspection means.

A stopper may be arranged at the fixation means between the rotation means and the first end, which restricts the axial movement of the rotation means towards the working appliance.

Thereby, it is ensured that during a pivoting movement of the pivot head or the pivoting means, the rotation means has a minimum distance to the camera head in order to ensure that a deflection force for deflecting the inspection means is provided by the pivoting movement of the pivot head carried out via the pulling means.

According to an embodiment of the invention, pivoting the pivot means about the pivot axis causes a deflection of the first end of the fixation means out of the longitudinal axis of the inspection means. Because the camera head or the working appliance is arranged at the first end of the fixation means, also the camera head or the working appliance is deflected accordingly.

It is preferred, if the fixation means has a reset force acting against a deflection force effected by a pivoting of the pivoting means about the pivot axis. Thereby, it is ensured in an easy manner that upon a pivoting back of the pivoting means, the fixation means or the working appliance may return again into their starting position. Hereby, the starting position is that position in which no deflection force is applied to the inspection means by the pivoting means.

According to an embodiment of the invention, the fixation means may be configured as a rod.

It has been found to be advantageous, if the first end of the pulling means may be fixed at the pivoting means releasably. Moreover, it is preferable, if the second end of the pulling means may be fixed at the rotation means releasably. Thereby, the pulling means may be detached from the inspection means, as far as only pipe inspections are carried out, for which the inspection means does not need to be deflected.

According to a further embodiment of the invention, the housing may be fixed to the first end of the fixation means releasably. Thereby, the camera head may be re-used for other inspection systems, too. For example, the camera head may be fixed to a carriage of an inspection system.

According to an embodiment of the invention, it is provided for fixation means being provided at the second end of the fixation means in order to fix the inspection means, preferably releasably, at an inspection and/or maintenance system.

A pushing rod or a pushing stick may be arranged at the second end of the fixation means, preferably releasably.

It has been found to be especially advantageous, if the pivoting means comprises an object lens and an image sensor.

The deflection means may comprise a first drive unit in order to pivot or rotate the pivoting means about the pivot axis relative to the housing.

The deflection means may further comprise a second drive unit in order to rotate the working appliance or the housing about the longitudinal axis of the fixation means.

Further, an inspection and/or maintenance system is/are provided by the invention, in particular, pipe inspection and/or maintenance system, comprising a deflection means according to the invention.

The inspection and/or maintenance system may be configured as a pushing system, wherein the deflection means is arranged at a front end of a pushing rod or a pushing stick, preferably releasably.

BRIEF DESCRIPTION OF THE DRAWINGS

Further details and features of the invention as well as concrete, in particular, preferred embodiments of the invention may be derived from the subsequent description in connection with the drawings, in which FIGS. 1A and 1B show two images of a deflection means of an inspection means according to the invention, wherein FIG. 1A is the inspection means in its starting position, and in FIG. 1B, the inspection means is shown in its deflected or turned away position.

DETAILED DESCRIPTION

Figures 1A, 1B:
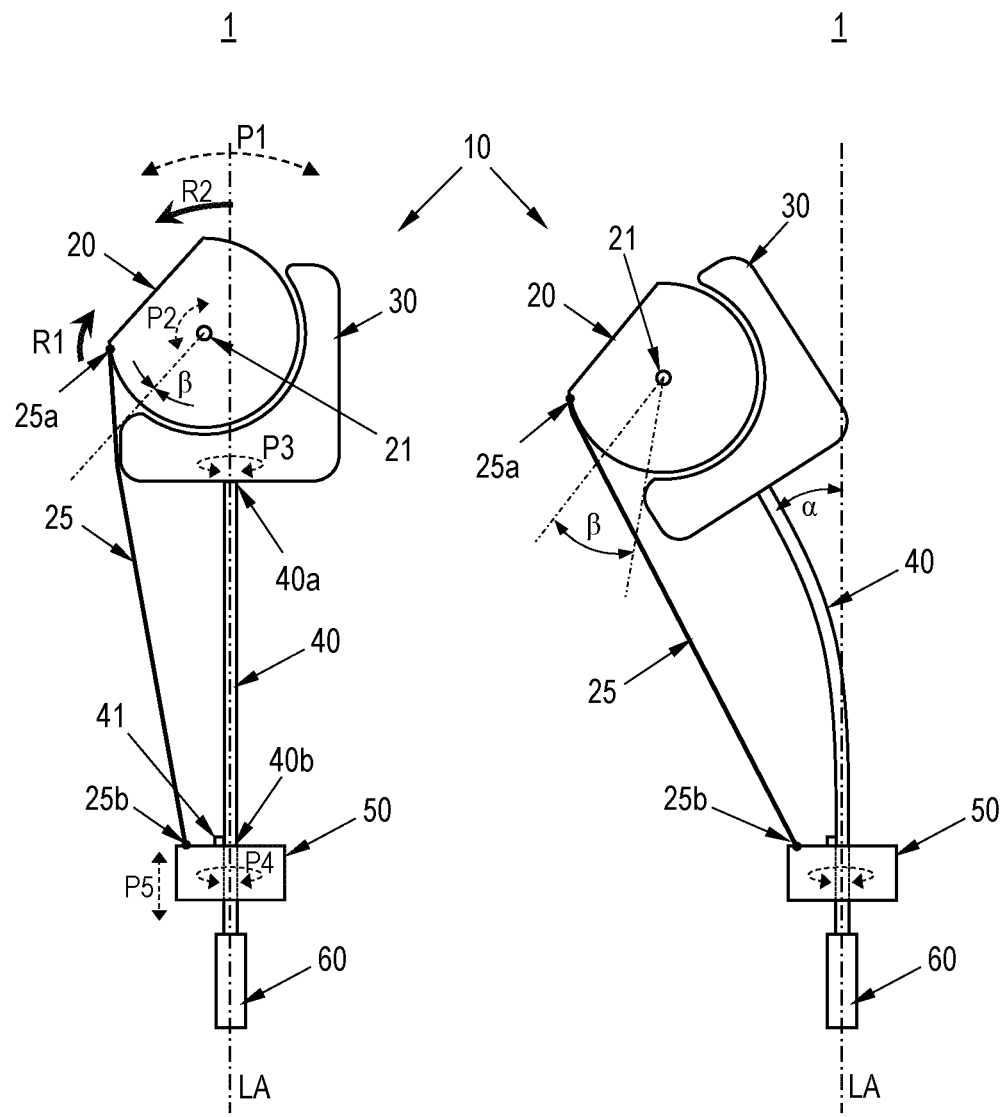

FIGS. 1A and 1B show a deflection means of an inspection means 1 according to the invention in sectional view. In FIG. 1A, the inspection means 1 is shown in its normal position or starting position, i.e., in a status or position, according to which the inspection means is not deflected or turned away. In FIG. 1B, the inspection means is shown in its deflected or turned away position. The means provided according to the invention for the deflecting or turning away as well as the functioning of the deflection means are described in further detail below.

The deflection means comprises a working appliance 10 with a housing 30 and a pivoting means 20, a fixation means 40 and a pulling means 25. Instead of the housing, also another main body, for example, a pivoting fork, may be provided, at which the pivoting means is arranged pivotably.

Here, the fixation means 40 is configured as flexible rod, which has a reset force. The reset force of the rod 40 may, for example, be provided by means of a reset spring arranged at or in the rod. Alternatively, a reset force of the rod 40 may be provided by the rod 40 having a shape memory at least in sections, to which temperature may be applied. Upon application of a predetermined temperature to the shape memory material, the rod is returned into its normal position or starting position, as shown in FIG. 1A.

The pulling means 25, here, is configured as a rope, wherein the rope preferably is made from a wear-resistant material in order to avoid wear of the rope 25 as far as possible. Moreover, it is advantageous, if the rope 25, upon application of a pulling force, does not change its length.

At the first or front end 40a of the fixation means or the rod 40, the working appliance 10 is arranged, wherein the working appliance 10, here, is configured as camera head. The camera head 10 comprises a housing 30 and a pivoting means 20, wherein the pivoting means is pivotable about the pivot axis 21 relative to the housing 30. The possible pivoting or rotational movement of the pivoting head 20, here, is shown by the arrow P2. The pivot axis 21, here, runs perpendicular to the longitudinal axis LA of the inspection means 1.

Here, the object lens and an image sensor of a camera or video camera are arranged in the pivoting head 20.

A first or front end 25a of the pulling means 25 is fixed at the pivoting head 20. The second or rear end 25b of the pulling means 25 is fixed at a rotation means 50, which is arranged at a second or rear end 40b of the fixation means 40.

By rotating or pivoting of the pivoting head 20 about its pivot axis 21 towards the arrow R1, a tractive force is applied to the rope 25 being non-changeable in its length such that a deflection or turning force is applied to the inspection means 1 or the rod 40. This deflection or turning force causes the rod 40 to be brought into a deflected or turned away position—as shown in FIG. 1B from its starting position shown in FIG. 1A. The pivoting direction of the camera head 10 affected by the rotational movement R1 of the pivoting head 20 is indicated by the arrow R2.

The deflecting or turning away of the rod 40 due to the pivoting movement of the pivoting head 21 is ensured by the length of the rope 25 not being changeable. Due to the pivoting movement R1 of the pivoting head 20, the distance between the point, at which the rope 25 is fixed to the pivoting head 20, and the point, at which the rope 25 is fixed to the rotational means 50, is increased. Because the rope, however, is non-changeable in its length, the rod 40 is deflected in the direction of the arrow R2 such that the distance of the two fixation points substantially remains the same.

By the configuration of the deflection means according to the invention, it is, moreover, ensured that the optical axis of the camera head substantially remains the same during the deflection procedure. This has the advantage that the operator always views that region to which it is to be turned off. In summary, this means that it is advantageous, if, in the deflected state of the inspection means, the deflection angle β of the pivoting head 20 about the pivot axis 21 corresponds to the deflection or turning angle α.

With respect to the embodiment of an inspection means according to the invention or a deflection means according to the invention shown in FIGS. 1A and 1B, the working appliance or the camera head 10 or the housing or the camera housing 30 is arranged rotatably about the longitudinal axis LA of the inspection means 1 or the rod 40 at the first end 40a of the rod 40. The possible rotational movement is indicated by the arrow P3. This has the advantage that by means of rotation of the camera head 10 or the camera housing 30, the deflection or turning direction may be set.

In order to avoid that during rotation of the camera head 10 or the camera housing 30 about the longitudinal axis LA of the inspection means 1, the inspection means 1 is deflected or turned, it is provided that also the rotation means 50 is arranged rotatably about the longitudinal axis LA of the rod 40 at the second or rear end 40b of the rod 40. Thereby, the rotation means 50 is configured such that the rotation of the rotation means 50 results synchronously to a rotation of the camera head 10 or the camera housing 30. By this synchronous rotation, it is ensured that the distance between the two fixation means of the rope 25 does not change during a rotation of the camera head 10 or the camera housing 30 such that a deflection is prevented.

For the rotation of the camera head 10 or the camera housing 30, a drive means, for example, a step motor, may be provided. The rotation means 50, on the other hand, may be arranged without a drive at the rod 40, for example, may be supported in a floating manner. Alternatively, also for the rotation of the rotation means 50, a drive means, for example, a step motor, may be provided. In this case, however, it has to be ensured that the drive means of the camera head is operated synchronously to the drive means of the rotation means 50.

At the rear or second end 40b of the rod 40, a fixation device 60 may be provided in order to fix the inspection means at a pushing rod or a pushing stick.

Further, in the region of the second or rear end 40b of the fixation means 40, a stopper 41 is provided between the rotation means 50 and the first or front end 40a of the fixation means 40 preventing the rotation means 50 from being displaced beyond the stopper 41 in axial direction towards the camera head 10. This ensures that the rotation means 50 always has a minimum distance to the camera head 10. It may be preferable, if the rotational means 50 is displaceable axially into the opposite direction. Thereby, it can be ensured, for example, that the rope 25 always has a certain tension also in a starting position of the inspection means 1.

Figure 2A:
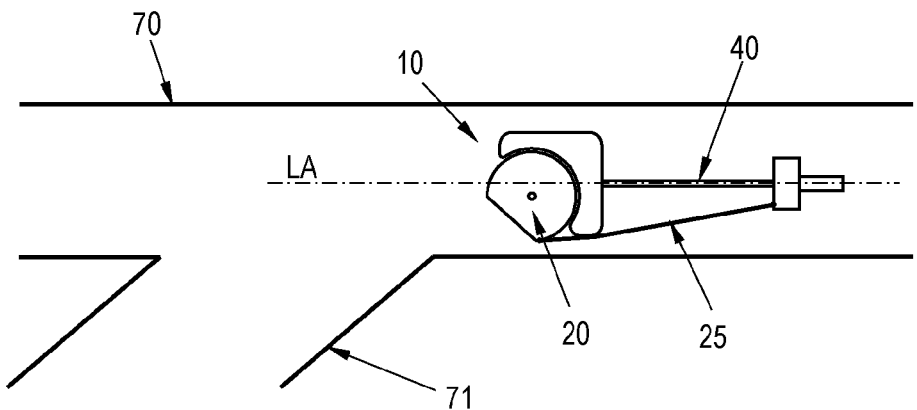
FIGS. 2A and 2B show an application example for the use of a deflection means according to the invention.
Figure 2B:
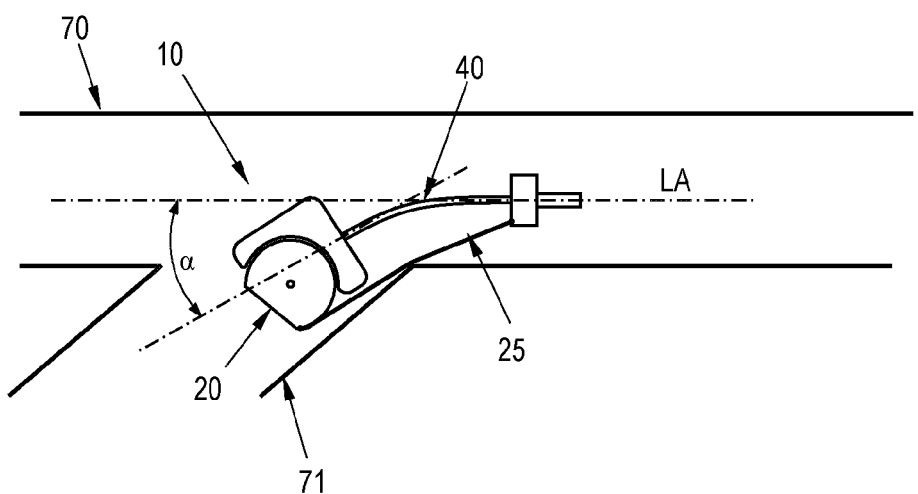

FIGS. 2A and 2B show an example for the application of an inspection means according to the invention or an inspection means with a deflection means according to the invention.

In FIG. 2A, an inspection means with a deflection means is shown, which is arranged in a main pipe 70, from which a subsidiary pipe 71 branches off. At the front end of the rod 40, a camera head 10 having a pivoting head 20 is arranged, wherein the pivoting head 20 is pivotable relative to the camera housing of the camera head 10, as explained with reference to FIGS. 1A and 1B. The inspection means is to turn off from the main pipe 71 into the subsidiary pipe 71 in order to be able to also inspect the subsidiary pipe 71.

In FIG. 2A, the deflection means or the inspection means is shown in a neutral position, in which the camera head 10 is directed straight forwards or in which the rod 40 substantially runs parallel to the longitudinal axis of the main pipe 70. In this neutral position, the pivoting head 20 is pivoted about an angle β=0.

FIG. 2B shows the inspection means or deflection means shown in FIG. 2A, according to which the front end of the rod 40 is deflected from its neutral position and is turned into the subsidiary pipe 71.

In order to deflect the inspection means from the neutral position shown in FIG. 2A into the subsidiary pipe 71, the pivoting head 20 is pivoted about a certain angle β>0 (cf. FIGS. 1A and 1B), such that the pivoting movement of the pivoting head 20 effects an application of a tractive force to the rope 25. Due to this tractive force, the front end of the rope 40 is deflected from its neutral position such that also the camera head 10 arranged at the front end of the rod 40 is deflected from its neutral position and is turned into the subsidiary pipe 71.

Now, the inspection means may be inserted into the subsidiary pipe 71. As soon as at least the camera head 10 is positioned within the subsidiary pipe 71, the pivoting head 20 may be pivoted back. This pivoting backwards effects that the tractive force applied to the pulling rope 25 is reduced, and the reset force of the rod 40 brings the camera head 10 or the rod 40 back again into their neutral positions. The inspection means 1 may then be advanced further within the subsidiary pipe 71, wherein the inspection means is in a neutral position.

As far as the subsidiary pipe 71 is not in the same direction as the fixation point of the rope 25 at the pivoting means 20, the camera head 10 may be rotated about its longitudinal axis until the fixation point of the rope 25 at the pivoting head 20 is directed towards the subsidiary pipe 71. The rotation means 50 rotates synchronously to the rotational movement of the camera head. After the camera head or the fixation point at the rope 25 has been aligned correctly at the pivoting head, the deflection procedure may be started by pivoting the pivoting head 20, as described above.

REFERENCE NUMERALS 1 inspection means
10 camera head of the inspection means 1
20 pivoting head (pivoting means) of the camera head 10
21 pivot axis of the pivoting head 20
25 pulling means (e.g., rope)
25a first (front) end of the pulling means 25
25b second (rear) end of the pulling means 25
30 camera housing of the camera head 10
40 flexible fixation means with reset force (e.g., rope with reset spring)
40a first (front) end of the fixation means 40
40b second (rear) end of the fixation means 40
41 stopper
50 rotation means (supported in a drive-less manner)
60 pushing rod or fixation device
70 pipe (main pipe)
71 pipe (subsidiary pipe)
α deflection or turning angle
β pivoting angle of the pivoting means 20
LA longitudinal axis of the inspection means 1 or the fixation means 40
P1 deflection means of the camera head 10
P2 pivoting movement of the pivoting head 20
P3 rotational movement of the camera head 10 or the camera housing 30
P4 rotational movement of the rotation means 50
P5 axial movement of the rotation means 50
R1 rotation direction of the pivoting head 20
R2 pivoting movement of the camera head 10

What is claimed is:

1. A deflection means of an inspection means, wherein the deflection means comprises:
    a working appliance having a main body and a pivoting means, wherein the pivoting means is arranged pivotably about a pivot axis relative to the main body,
    a flexible fixation means, having a first end and a second end, wherein the main body is arranged at the first end, and
    a pulling means having a first end and a second end, wherein the first end of the pulling means is fixed at the pivoting means, and wherein the second end of the pulling means is fixed in the region of the second end of the fixation means.

2. The deflection means of claim 1, wherein the main body comprises a housing, wherein the pivoting means is arranged pivotably about the pivot axis relative to the housing at or within the housing.

3. The deflection means of claim 2, wherein the working appliance comprises a camera head and the housing a camera housing, wherein the pivoting means is pivotable relative to the camera housing.

4. The deflection means of claim 1, wherein at the second end of the fixation means, a rotation means is arranged, and wherein the second end of the pulling means is fixed at the rotation means.

5. The deflection means of claim 4, wherein the rotation means is arranged rotatably about the longitudinal axis of the fixation means at the fixation means.

6. The deflection means of claim 4, wherein the rotation means and the working appliance or the housing are rotatable synchronously about the longitudinal axis of the fixation means.

7. The deflection means of claim 4, wherein the rotation means is movable coaxially at the second end of the fixation means.

8. The deflection means of claim 7, wherein a stopper is arranged at the fixation means between the rotation means and the first end, which restricts the axial movement of the rotation means towards the working appliance.

9. The deflection means of claim 1, wherein the working appliance or the housing is arranged pivotably about the longitudinal axis of the fixation means at the fixation means.

10. The deflection means of claim 1, wherein the pulling means comprises a pulling rope.

11. The deflection means of claim 1, wherein a pivoting of the pivoting means about the pivot axis effects a deflection of the first end of the fixation means out of the longitudinal axis of the inspection means.

12. The deflection means of claim 1, wherein the fixation means has a reset force acting against a deflection force effected by a pivoting of the pivoting means about the pivot axis.

13. The deflection means of claim 1, wherein the fixation means is configured as a rod.

14. The deflection means of claim 1, wherein the first end of the pulling means may be fixed to the pivoting means releasably.

15. The deflection means of claim 1, wherein the second end of the pulling means may be fixed to the rotation means releasably.

16. The deflection means of claim 1, wherein the housing may be fixed to the first end of the fixation means releasably.

17. The deflection means of claim 1, wherein at the second end of the fixation means, a pushing rod is arranged, preferably, releasably.

18. The deflection means of claim 1, wherein the pivoting means comprises an object lens and an image sensor.

19. The deflection means of claim 1, wherein the deflection means comprises a first drive unit in order to pivot the pivoting means about the pivot axis relative to the housing.

20. The deflection means of claim 1, wherein the deflection means comprises a second drive unit in order to rotate the working appliance or the housing about the longitudinal axis of the fixation means.

21. An inspection or maintenance system, in particular, sewage pipe inspection or maintenance system, comprising the deflection means of claim 1.

22. The inspection or maintenance system of claim 21, wherein the inspection or maintenance system is configured as pushing system, wherein the deflection means is arranged at a front end of the pushing rod or a pushing stick, preferably, releasably.

* * * * *